United States Patent [19]

Ichikawa et al.

[11] Patent Number: 4,820,759

[45] Date of Patent: Apr. 11, 1989

[54] POLYARYLENE THIOETHER COMPOSITION

[75] Inventors: Yukio Ichikawa; Takayuki Katto; Zenya Shiiki, all of Iwaki, Japan

[73] Assignee: Kureha Kagaku Kogyo Kabushiki Kaisha, Tokyo, Japan

[21] Appl. No.: 95,620

[22] Filed: Sep. 4, 1987

[30] Foreign Application Priority Data

Sep. 9, 1986 [JP] Japan ................. 61-211951

[51] Int. Cl.$^4$ ............ C08G 75/14; C08L 81/02
[52] U.S. Cl. ................. 524/413; 524/423; 524/424; 524/425; 524/430; 524/431; 524/432; 524/445; 524/447; 524/449; 524/443; 524/451; 524/456; 524/500; 524/538; 524/609; 525/500; 525/537
[58] Field of Search ........... 525/537, 500; 524/413, 524/423, 424, 425, 430, 431, 443, 444, 447, 449, 451, 456, 500, 538, 609

[56] References Cited

U.S. PATENT DOCUMENTS 4,699,975 10/1987 Katto et al. .................. 525/537

FOREIGN PATENT DOCUMENTS

| 0166451 | 1/1986 | European Pat. Off. . |
| 0216116 | 4/1987 | European Pat. Off. . |
| 11357 | 1/1984 | Japan .................. 525/537 |
| 1087752 | 5/1986 | Japan .................. 525/537 |
| 189895 | 8/1986 | Japan .................. 525/537 |

OTHER PUBLICATIONS

"Macromolecular Physics", by Bernhard Wunderlich, vol. 2, Crystal Nucleation, Growth, Annealing, Academic Press, pp. 94 to 99.
"Mixed Crystals in Polymer Blends", by Gohil and Petermann; J. Macromol. Sci.-Phys., B18(2), 217-232 (1980).

Primary Examiner—Lewis T. Jacobs
Assistant Examiner—David W. Woodward
Attorney, Agent, or Firm—Oblon, Fisher, Spivak, McClelland & Maier

[57] ABSTRACT

A polyarylene thioether composition comprising (1) 100 parts by weight of a polyarylene thioether (A) having an average particle size of spherulites of not more than 2 μm, formed upon crystallization of the molten polymer at 250° C., obtained by treating a polyarylene thioether having a repeating unit of

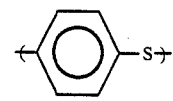

as the main constituent and an inherent solution viscosity, which is measured at 206° C. in 1-chloronaphthalene at a polymer concentration of 0.4 g/100 ml solution, of 0.30 to 0.90 dl/g with an aqueous solution of non-oxidative strong acid or non-oxidative strong-acid-weak-base type salt; and (2) 11 to 800 parts by weight of a polyarylene thioether (B) having a necessary time for 50% crystallization of not more than 50 seconds upon crystallization of the molten polymer at 250° C. obtained by treating a polyarylene thioether having a repeating unit of as the main constituent and an inherent solution viscosity, which is measured at 206° C. in 1-chloronaphthalene at a polymer concentration of 0.4 g/100 ml solution, of 0.05 to 0.25 dl/g with an aqueous solution of non-oxidative strong acid or non-oxidative strong-acid-weak-base type salt, is disclosed.

9 Claims, No Drawings

POLYARYLENE THIOETHER COMPOSITION

BACKGROUND OF THE INVENTION

This invention concerns a polyarylene thioether (hereinafter referred to as PATE) composition excellent in processability and toughness in which crystallizing rate is increased and the size of the spherulites is reduced.

PATE has been developed as a heat resistant, chemical resistant and flame resistant thermoplastic resin. Particularly, since PATE crystallizes easily, it has advantageous features in that it is excellent in the melt processability such as for injection molding and in that resultant molding products have excellent physical properties such as dimensional stability, strength, hardness and insulating performance. Taking these advantages, PATE has been employed in the industrial fields of electric, electronics, automobiles, aircrafts, precision instruments and chemicals.

However, those PATEs having high crystallizing rate from the molten state and thus suitable for injection molding, etc. generally show a tendency of producing coarse spherulites upon crystallization and, as a result, their molded products become poor in toughness and impact resistance. While on the other hand, those PATEs comprising fine spherulites formed upon crystallization from the molten state and providing molded products of high toughness and impact resistance, generally show lower crystallizing rate and, accordingly, not suitable for the melt procesing, such as injection molding, which requires short molding cycle.

In view of the above, the conventional PATEs involve a problem for obtaining molded products of high toughness and high impact resistance by means of injection molding, etc.

The present inventors have made an extensive study on a method of improving the crystallizing rate together with toughness and impact resistance of PATE resin and, finally, have found that an adequate blend of a PATE having extremely high crystallizing rate (hereinafter referred to as PATE of high crystallizing rate) and a PATE forming extremely fine spherulites (hereinafter referred to as fine spherulitic PATE) has surprisingly higher crystallizing rate and forms smaller size of spherulites as compared with PATEs of identical solution viscosity or melt viscosity used alone (PATE just obtained from polymerization reaction). It is supposed that this phenomenon is due to the fact that at first, the fine spherulitic PATE forms a great number of crystal nuclei in the cooling step of the molten blended composition and then the PATE of high crystallizing rate grows rapidly into spherulites around the nuclei.

Further, it has surprisingly been found that the crystallizing rate of the blend, depending on the composition of the blend, can be higher than that of the PATE of high crystallizing rate alone which is one of the components thereof.

The present invention has been accomplished based on the above findings.

SUMMARY OF THE INVENTION

The object of the present invention is to provide a PATE having short processing cycle in a melt processing and giving molded products of excellent toughness and impact resistance.

Another object of the present invention is to provide a PATE having high crystallizing rate when a molten polymer is cooled to crystallize and at the same time, having small average size of spherulites.

Further object of the present invention is to provide a PATE composition containing 100 parts by weight of a PATE (A) having a repeating unit of

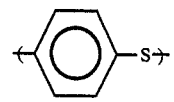

as the main constituent and the average particle size of spherulites of not more than 2 μm formed upon crystallization of a molten polymer at 250° C. and 11 to 800 parts by weight of PATE (B) having a repeating unit of

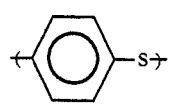

as the main constituent and having a necessary time for 50% crystallization of not more than 50 seconds upon crystallization of a molten polymer at 250° C.

Still further object of the present invention is to provide a composite PATE compound comprising 100 parts by weight of the PATE composition as described above and up to 300 parts by weight of an inorganic powdery filler, fibrous filler or a mixture thereof.

DETAILED DESCRIPTION OF THE INVENTION

The PATE composition according to the present invention comprises the following PATEs (A) and (B):

(A) 100 parts by weight of a PATE comprising a repeating unit of

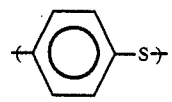

as the main constituent with an average particle size of spherulites of not more than 2 μm formed upon crystallization of a molten polymer at 250° C., (B) 11 to 800 parts by weight of a PATE comprising a repeating unit of

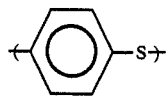

as the main constituent with a necessary time for 50% crystallization of not more than 50 seconds upon crystallization of a molten polymer at 250° C.

Another PATE composition of composite compound of the present invention comprises 100 parts by weight of the PATE composition ((A)+(B)) and (C) up to 300 parts by weight of inorganic powdery fillers, fibrous fillers or a mixture thereof.

With the composition according to the present invention, it is possible to obtain a PATE having high crystallizing rate and fine spherulites, accordingly, capable of satisfying the melt processability together with the toughness and the impact resistance.

The present invention provides a PATE composition comprising fine spherulitic PATE, i.e., PATE (A) and a PATE of high crystallizing rate, i.e., the PATE (B) as the main resin components.

Fine spherulitic PATE (PATE (A))

Original PATE

Generally, PATE means a polymer comprising a repeating unit of ${+}Ar{-}S{+}$ (Ar: arylene group) as the constituent, the PATE according to the present invention comprises p-phenylene group as arylene group as the main constituent. The expression "as the main constituent" in the present invention means that the repeating unit of

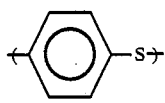

contained not less than 60 mol % and, preferably, not less than 75 mol % of the total repeating unit of ${+}Ar{-}S{+}$.

Those constituting p-phenylene group as arylene group are preferred for the formation of fine spherulites. They are also preferred in view of physical properties such as heat resistance, moldability and mechanical properties.

Arylene groups other than p-phenylene group as the main constituent usable herein can include, for example, m-phenylene group

o-phenylene group

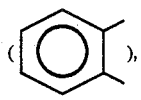

alkyl-substituted phenylene group

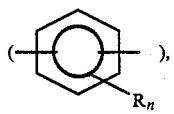

in which R represents alkyl group (preferably lower alkyl group) and n is an integer of 1 to 4, p,p'-diphenylenesulfone group

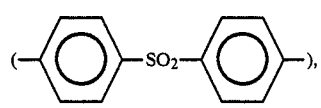

p,p'-biphenylene group

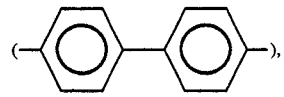

p,p'-diphenylene ether group

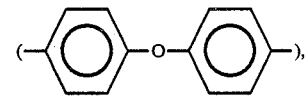

p,p'-diphenylene carbonyl group

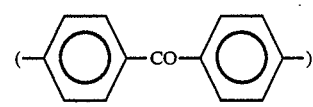

and naphthalene group

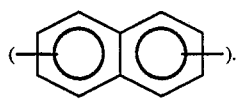

From the viewpoint of processability, those copolymers containing different types of repeating units are generally better than those homopolymers containing only the repeating unit of

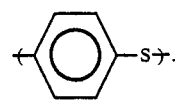

As the copolymer, those comprising

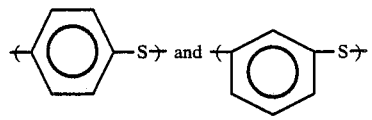

are preferred and, particularly, those containing the respective repeating units in the block form are more preferable to those containing such units in the random form (refer to EP-A No. 166,451), because use of the block copolymer is excellent over use of the random copolymer in physical properties (heat resistance, mechanical properties, etc.), although they are substantially equal with respect to processability. 5 to 40 mol % of the repeating unit of

in the block copolymer, namely, 95 to 60 mol % of the repeating unit of

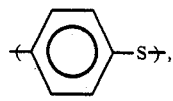

is preferable and, particularly, 10 to 25 mol % of the repeating unit of

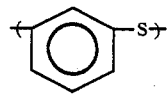

is more preferable.

As the PATE according to the present invention, those of substantially linear structure are preferred in respect to property of spherulites and physical properties. However, crosslinked product obtained by using a small amount of a crosslinking agent (for example, 1,2,4-trihalobenzene) upon polymerization, within a range not impairing the spherulites property and physical property, may also be used. Uncured PATE is preferred as the original polymer for the present invention. Judging from the fact that (a) cured PATE is difficult to form fine molten spherulites of not more than 2 μm in size and its crystallizing rate is small and (b) as it contains many branched and cross-linked structures, its molded product has insufficient mechanical strength, is discolored severely and is unstable upon melt processing, cured PATE is not preferable in respect to physical properties and processability.

As the original PATE of the present invention, those having melting point higher than 250° C. are preferred. If the melting point is lower than 250° C., the major feature as a heat resistant polymer is impaired.

In the case of producing a fine spherulitic PATE with high crystallizing rate by processing such PATE, the molecular weight of the original PATE is an important factor (will be explained later in detail).

The PATE preferable for the present invention as described above can be produced generally by bringing an alkali metal sulfide (for example, sodium sulfide) and a halo aromatic compound containing p-dihalo benzene as the main ingredient into a dehalogenating-sulfurizing reaction in an aprotic organic polar solvent (for example, N-methyl pyrrolidone). Practically, it can be produced with an economical advantage, for example, by the method described in U.S. Pat. No. 4,645,826 filed by the present inventors. In addition, a method described in U.S. Pat. No. 3,919,177 in which a polymerization aid such as a carboxylic acid salt is added in a large amount to obtain a high molecular weight PATE can also be used. However, the latter method is disadvantageous from an economical point of view.

Spherulite Property

The PATE (A) with fine spherulites according to the present invention has a feature in that the size of spherulites formed upon crystallization of a molten polymer at 250° C. is small.

The spherulites include those spherulites formed from a crystalline polymer in a molten state upon crystallization thereof at a temperature lower than the melting point, that is, "molten spherulites" and spherulites formed by rapidly cooling a crystalline polymer in a molten state once into an amorphous solid and heating the solid again to a temperature higher than the secondary transition point, which should be called, so to speak, "solid spherulites".

The spherulites formed in a molded product in usual melt processing method, such as extrusion molding, injection molding and compression molding are of the "molten spherulites" type. The subject in the present invention is PATE with the spherulites of this type.

As the general property of crystalline polymers, the toughness and the impact resistance of their molded products are greater as the size of spherulites formed in the molded products is smaller. The size of the molten spherulites formed with a conventional PATE is coarse and, accordingly, the molded products lack in toughness and impact strength. Since the size of the molten spherulites formed with an identical polymer varies to some extent depending on the cooling condition, the size of the spherulites formed when the polymer is heated to melt at 340° C. for one minute and soon after maintained at 250° C. is assumed as the standard. Then, the average size of the molten spherulites formed with conventional PATEs has been coarser, being about 10 to 20 μm. While on the other hand, the average size of the molten spherulites of the PATE according to the present invention is generally not more than 8 μm and in the case of necessity, it is possible to make the average size not more than 2 μm. Accordingly, the composition of the present invention is possible to form outstandingly fine molten spherulites, and its molded products with remarkably improved toughness and impact resistance can be obtained by the contribution of the PATE (A).

PATE OF HIGH CRYSTALLIZING RATE (PATE (B))

Original PATE

All of the previous description made for the original PATE regarding fine spherulitic PATE (A) are applicable also to the PATE of high crystallizing rate. However, descriptions with respect to the fine spherulites and formation thereof should be read as those for the high crystallizing rate, although a part of the descriptions is also made for the high crystallizing rate.

Crystallizing Rate Property

In conventional PATEs, the time for crystallization required till the crystallization ratio reaches 50% when a molten polymer is crystallized, for example, at 250° C., that is, so-called "necessary time for 50% crystallization", is usually in the order of several hundreds to several thousands seconds. Besides, there has usually been a tendency that those having finer spherulites take longer time period for crystallization. Accordingly, it has been difficult to shorten the time required for the solidification of a molten product in a mold and there has been a certain limit for improving the molding cycle in injection molding, etc.

However, in the present invention, when the fine spherulitic PATE (A) and the PATE (B) of high crystallizing rate are blended at an adequate ratio, it can be estimated that while PATE (A) rapidly forms a great number of crystalline nuclei, PATE (B) makes crystals grow up rapidly. Therefore, the totally crystallizing rate is estimated to be an effectively high value by the approximate calculation based upon the following equation:

(Totally crystallizing rate) ∝ 0 (Nuclei forming rate)×(crystals growing rate)

Namely, in the PATE composition according to the present invention, the necessary time for 50% crystallization at 250° C. can be adjusted to shorter than about 100 seconds and, when required, to not more than 50 seconds. This enables to improve the molding cycle in a melt processing, particularly, in an injection molding.

Production of PATE Composition

The PATE composition according to the present invention can be prepared by separately preparing PATEs (A) and (B) and then blending both of them together.

In addition to such a typical production process, there can be another method if any common matter exists in the production process of the PATEs (A) and (B).

For instance, in the case of treating each of the PATEs (A) and (B) separately with acidic solutions, the treating method and conditions are common and only the molecular weight for each of the original PATEs being different. Accordingly, the composition according to the present invention can be obtained at one time by first blending PATE (A) and PATE (B) and then applying treatment with the acidic solution rather than treating PATE (A) and PATE (B) separately and then blending them. It will depend on the case which treatment is more advantageous.

(1) Production of PATE with Fine Spherulites (PATE (A))

Production of PATE with fine spherulites according to the present invention can include, for example, the following process, namely, a process of selecting a PATE having an adequate molecular weight among the PATEs with the structure appropriate to the present invention and treating it in a solution of a non-oxidative strong acid or of a non-oxidative strong-acid-weak-base type salt, although the method is not limited thereto.

Molecular Weight of Original PATE

Since the molecular weight of a PATE gives a significant effect on its size of molten spherulites, this is an extremely important factor.

A preferred range for the molecular weight of PATE with fine spherulites according to the present invention, when expressed by an inherent solution viscosity $\eta_{inh}$ (measured at 206° C. with a 1-chloronaphthalene solution of PATE at 0.4 g/dl in concentration), is within a range not less than 0.30 and not more than 0.90 dl/g and, more preferably, in a range of 0.35 to 0.7 dl/g. If the $\eta_{inh}$ is less than 0.30 dl/g, it is difficult to form fine spherulites with the average size of not more than 2 μm. While on the other hand, if the $\eta_{inh}$ exceeds 0.90 dl/g, it is difficult to produce such PATE and, even if it is possible to produce, is difficult for the melt processing. Accordingly, they are not favorable from the production, fabrication and economical points of view.

Treatment with Acidic Solution

The effective method to obtain PATE with molten spherulites of not more than 2 μm in particle size is a process of the present invention, comprising (1) forming a PATE having the properties as described above through a polymerization reaction in a solvent, (2) separating the PATE formed from the reaction mixture and (3) treating in a solution of a non-oxidative strong acid or of a non-oxidative strong-acid-weak-base type salt. Namely, a polyarylene thioether (PATE) is formed through a dehalogenating-sulfurizing reaction between an alkali metal sulfide and a dihalo aromatic compound in an aprotic organic polar solvent and the solid polymer separated from the polymerization reaction mixture is treated as above. The solid polymer may be a wet or dried solid polymer separated from the liquid mixture by means of filtration, sieving, etc. or it may be a wet or solid polymer obtained after washing with methanol, water, etc. When the particle size is large, the polymer is preferably pulverized in a mill or the like before the treatment.

A treatment in a solution of a strong acid or in a solution of a strong-acid-weak-base type salt is applied to such polymer. Polymer content in the solution of the treating agent is preferably 2 to 70% by weight.

(a) Treatment with Strong Acid.

The polymer is added to a strong acid solution and treated under the condition of pH value of not more than 2 and, preferably, not more than 1.5. If the pH value of the treating solution is not lower than 2, reaction of terminal residues is undesirably insufficient. The temperature is 0° to 150° C., preferably, 20° to 100° C. and, more preferably, 20° to 80° C. Temperature lower than 0° C. is not preferable because penetration of the strong acid solution to the core part of solid polymer (usually granular or powdery) is difficult. While on the other hand, temperature higher than 150° C. is not preferable because the polymer may probably be cured. The treating time is 5 to 500 minutes, preferably, 10 to 300 minutes. The reaction is insufficient if the time for treatment is shorter than 5 minutes, whereas no substantial increase of the efficiency can be obtained if it exceeds 500 minutes and is uneconomical.

As the acid for the strong acid solution, a non-oxidative acid with the ionization constant K of not less than $10^{-3}$, measured in an aqueous solution at 25° C., is preferred. An oxidizing acid is not desirable because it may probably cause curing. Strong acid such as hydrochloric acid, diluted sulfuric acid, phosphoric acid, formic acid and halogenated acetic acid is preferred.

As a solvent for the strong acid solution, water or a mixture of water and alcohol, ketone or ether, mainly composed of water, is used. It is preferable that alcohol, ketone or ether has a sufficient mixability with water and a sufficient solubility of acid to form an aqueous solution as a solvent. The solubility of these organic solvents to water, solubility of water to these organic solvents and the solubility of the strong acids thereto are well-known in handbooks or like. Particularly, from the standpoint of its chemical stability and economical advantage, it is preferable to use hydrochloric acid, diluted sulfuric acid or phosphoric acid as the acid, and water, an aqueous solution of alcohol (particularly, lower alcohol) or an aqueous solution of ketone (particularly, di-lower alkyl ketone) as the solvent.

After treating with the strong acid solution, it is prferable, for obtaining thermally and chemically stable polymer, to wash out sufficiently the strong acid solution remaining in the solid polymer, or to neutralize the remaining acid with a weak base such as ammonia and then wash with water. Particularly, the latter method of neutralizing with a weak base is preferred because a polymer of excellent in color can be obtained easily. The use of weak base, not strong base, is necessary, because if the neutralization is conducted with a strong base, the size of molten spherulites may become almost similar to that before the treatment with the strong acid solution.

(b) Treatment with Strong-Acid-Weak-Base Type Salt.

As the strong acid in the strong-acid-weak-base type salt, the non-oxidative strong acid exemplified above, for example, hydrochloric acid, diluted sulfuric acid, maleic acid, formic acid, halogenated acetic acid, etc. is preferable and, as the weak bases, those having ionization constant K, measured in an aqueous solution at 25° C., of not more than $10^{-4}$ are preferred. Particularly, ammonia, pyridine, etc. are used preferably. Among possible combinations, $NH_4Cl$, $(NH_4)_2SO_4$ and $(NH_4)_3PO_4$ are pre due to their excellent effect.

As the solvent for these salts, those mentioned above for the strong acid solution may be used. Water and/or alcohol (particularly, lower alcohol) is particularly preferable in view of its high solubility of the salt.

The concentration of the salt in the solution for the treatment is within a range 0.1 to 30% by weight, preferably, 0.2 to 20% by weight. The effect is insufficient if the concentration is less than 0.1% by weight, whereas no substantial increase of effect can be obtained when it exceeds 30% by weight and so is uneconomical.

The temperature for the treatment is within a range of 0° to 150° C., preferably, 20° to 100° C. and, particularly preferable, 20° to 80° C. The time for the treatment is, preferably, 5 to 500 minutes and 10 to 300 minutes is particularly preferable. The reason for defining the temperature and the time for the treatment within the above ranges is same as described above for the strong acid treatment.

After treating with the salt solution, the treated polymer can be cleaned by simple water washing and be stable sufficiently. In the case of strong acid treatment (a) above, a treatment device made of expensive special corrosion resistant material (nickel, nickel alloy, etc.) has to be used since ordinary corrosion resistant material (stainless steels, etc.) is easily corroded. However, in the case of salt treatment (b), a treatment device made of usual corrosion resistant material (stainless steel, etc.) can be used and, accordingly, the method (b) is overwhelmingly advantageous and preferable in view of the production procedures and the economical points.

(2) Production of PATE of High Crystallizing Rate (PATE (B))

Production of PATE of high crystallizing rate according to the present invention can include, for example, the following process, namely, a process of selecting a PATE having an adequate molecular weight among the PATEs with the structure appropriate to the present invention and processing it in a solution of a non-oxidative strong acid or of a non-oxidative strong-acid-weak-base type salt, although the method is not limited thereto.

Molecular Weight of Original PATE

Since the molecular weight of a PATE gives a significant effect on its necessary time for 50% crystallization, this is an extremely important factor.

A preferred range for the molecular weight of PATE with high crystallizing rate according to the present invention, when expressed by an inherent soluton viscosity $\eta_{inh}$ (measured at 206° C. with a 1-chloronaphthalene solution of PATE at 0.4 g/dl in concentration), is within a range not less than 0.05 and not more than 0.25 dl/g and, more preferably, in a range of 0.10 to 0.20 dl/g.

If the $\eta_{inh}$ is in excess of 0.25 dl/g, it is difficult to obtain a PATE having a necessary time for 50% crystallization of not more than 50 seconds. While on the other hand, the $\eta_{inh}$ of less than 0.05 dl/g is not preferred from the fabrication and physical properties point of view, for example, the melt processing is difficult due to the low melt viscosity and mechanical properties of resultant molded products are poor.

Acidic Solution Treatment

The treatment with the acidic solution for the production of a PATE of high crystallizing rate is quite identical with the acidic solution treatment for the production of a fine spherulitic PATE described above, provided that the solution viscosity of the original PATE to be treated is low.

(3) Production of PATE composition

The composition according to the present invention can be produced, typically, by blending PATEs (A) and (B) in a predetermined ratio.

The blending ratio is 11 to 800 parts by weight and, preferably, 15 to 200 parts by weight of the PATE of high crystallizing rate (PATE (B)) based on 100 parts by weight of the fine spherulitic PATE (PATE (A)). If the blending ratio of PATE (B) is less than 11 parts by weight, improvement in the crystallizing rate is insufficient. While on the other hand, if the ratio is in excess of 800 parts by weight, effect for reducing the size of spherulites becomes insufficient.

It is necessary that the blending ratio for PATEs (A) and (B) is determined within the above range and also in such a manner that the aimed average particle size of spherulites and the crystallizing rate can be obtained.

The procedures for the blending may be conducted according to a well-known method and, specifically, by a method, for example, of dry blending the PATEs (A) and (B) preferably in a powdery state using a blender, mixer, etc. and then melt-kneading them by a melt extruder or the like.

In addition to the production by conducting "blending after acidic solution treatment" to the two types of original PATEs as described above, the following method is also described above, i.e., the composition according to the present invention can also be produced by conducting "acidic solution treatment after blending" to the two types of original PATEs.

Composite PATE Compound

The PATE composition according to the present invention can be applied alone to each of the melt processing methods, but it can be used as a compound with one or more materials selected from (i) fibrous fillers such as glass fibers, carbonaceous fibers, silica fibers, alumina fibers, silicon carbide fibers, zirconia fibers, calcium titanate fibers, wollastonite, calcium sulfate fibers and aramide fibers, (ii) inorganic powdery fillers such as talc, mica, clay, kaolin, calcium carbonate, magnesium carbonate, calcium silicate, magnesium silicate, silica, alumina, titanium white, carbon black, calcium sulfate, iron oxide, zinc oxide and copper oxide, (iii) synthetic resins such as polyolefin, polyester, polyamide, polyimide, polyether imide, polycarbonate, polyphenylene ether, polysulfone, polyether sulfone, polyether ether ketone, polyether ketone, polyarylene, polyacetal, polyvinylidene fluoride, polyethylene tetrafluoride, polystyrene, ABS resin, epoxy resin, urethane resin, silicone resin and phenol resin, or (iv) elastomers such as polyolefin rubber, fluorine rubber, silicone rubber, hydrogenated SBR, butyl rubber, polyester rubber and polyamide rubber.

However, to take advantage of the feature of the PATE with fine spherulites of the present invention, it is preferred that the PATE is contained in the composition at least not less than 20% by weight, more preferable, not less than 30% by weight and, particularly preferable, not less than 50% by weight.

One of concrete examples of such a composite PATE compound comprises up to 300 parts by weight of fibrous filler and/or inorganic powdery filler and 100 parts by weight of the total of the PATEs (A) and (B) (corresponding to the blending of (i) and/or (ii) described above). It is of course possible that the composite PATE compound further contains the foregoing synthetic resins (iii) and/or elastomers (iv).

Since the PATE composition according to the present invention or the composite PATE compound forms fine spherulites upon melt processing to provide tough molded product, as well as it shows high crystallizing rate and satisfactory moldability, it can be applied to various types of melt processing such as extrusion molding, inflation molding, injection molding, compression molding and blow molding. Among all, it is suitable for the application use such as packaging materials (for use in IC, capacitors, transistors, etc.) and as precision mechanical components by the injection molding, extrusion molding or compression molding.

EXPERIMENTAL EXAMPLE

Synthetic Experimental Example 1

372 kg of hydrous sodium sulfide (solid content, 46.10%) and 1000 kg of N-methyl pyrrolidone (NMP) were charged in a titanium-lined autoclave and the temperature was increased to about 203° C. to distill out 146 kg of water. 6 kg of water and 70 kg of NMP were supplemented additionally (total water/NMP=3.0 mol/kg). Then, 353 kg of p-dichlorobenzene was charged (total arylene group/NMP=2.25 mol/kg) to the autoclave.

After reacting at 210° C. for 5 hours, 77 kg of water was added (total water/NMP=7.0 mol/kg). Then, the contents were polymerized at 258° C. for 1.5 hours and at 245° C. for 4 hours.

The reaction mixture was sieved through a 0.1 mm mesh screen to separate only the granular polymer which was washed with acetone and water to obtain a washed polymer.

A portion of the washed polymer was immersed in an aqueous 2% - $NH_4Cl$ solution and treated at 40° C. for 30 minutes. Then, it was washed with water and dried at 80° C. under a reduced pressure to obtain a polymer A.

Synthetic Experimental Example 2:

Into a titanium-lined autoclave, 424 kg of hydrous sodium sulfide (solid content, 46.07%) and 900 kg of NMP were charged and the temperature was increased to about 203° C. to distill off 168 kg of water. 4 kg of water and 70 kg of NMP were supplied additionally (total water/NMP=3.5 mol/kg). Then 361.5 kg of p-dichlorobenzene was charged (total arylene group/NMP=2.54 mol/kg).

After reacting at 220° C. for 4.5 hours, 70 kg of water was supplied additionally (total water/NMP=7.5 mol/kg). Then, it was polymerized at 255° C. for 5 hours.

The reaction mixture was sieved through a 0.1 mm mesh screen to separate only the granular polymer which was washed with acetone and water to obtain a washed polymer.

A portion of the washed polymer was immersed in an aqueous 2% - $NH_4Cl$ solution and treated at 40° C. for 30 minutes. Then, it was washed with water and dried at 80° C. under a reduced pressure to obtain a polymer B.

Synthetic Experimental Example 3:

Into a titanium-lined autoclave, 424 kg of hydrous sodium sulfide (solid content, 46.07%) and 931.5 kg of NMP were charged and the temperature was increased to about 203° C. to distill off 169 kg of water. 3 kg of water and 41.5 kg of NMP were supplied additionally (total water/NMP=3.5 mol/kg). Then, 364 kg of p-dichlorobenzene was charged (total arylene group/NMP=2.5 mol/kg).

After reacting at 220° C. for 5 hours, 136 kg of water was supplied additionally (total water/NMP=11.3 mol/kg). Then, it was polymerized at 260° C. for 4 hours.

The reaction mixture was sieved through a 0.1 mm mesh screen to separate only the granular polymer which was washed with acetone and water to obtain a washed polymer.

A portion of the washed polymer was immersed in an aqueous 2% - $NH_4Cl$ solution and treated at 40° C. for 30 minutes. Then, it was washed with water and dried at 80° C. under a reduced pressure to obtain a polymer C-1.

Synthetic Experimental Example 4:

Into a titanium-lined autoclave, 423 kg of hydrous sodium sulfide (solid content, 46.07%) and 930 kg of NMP were charged and the temperature was increased to about 203° C. to distill off 170 kg of water. 5 kg of water and 43 kg of NMP were supplied additionally (total water/NMP=3.5 mol/kg). Then, 362 kg of p-dichlorobenzene was charged (total arylene group/NMP=2.53 mol/kg). Afer reacting at 220° C. for 5 hours, 136 kg of water was supplied additionally (total water/NMP=11.3 mol/kg). Then, it was polymerized at 262° C. for 5 hours.

The reaction mixture was sieved through a 0.1 mm mesh screen to separate only the granular polymer, which was washed with acetone and water to obtain a washed polymer.

A portion of the washed polymer was immersed in an aqueous 2% - $NH_4Cl$ solution and treated at 40° C. for 30 minutes. Then, it was washed with water and dried at 80° C. under a reduced pressure to obtain a polymer C-2.

Synthetic Experimental Example 5:

Into a titanium-lined autoclave, 423 kg of hydrous sodium sulfide (solid content, 46.27%) and 940 kg of NMP were charged and the temperature was increased to about 203° C. to distill off 166 kg of water. 2.5 kg of water and 39 kg of NMP were supplied additionally (total water/NMP=3.5 mol/kg). Then, 366.7 kg of p-dichlorobenzene was charged (total arylene group/NMP=2.55 mol/kg).

After reacting at 220° C. for 5 hours, 70.5 kg of water was supplied additionally (total water/NMP=7.5 mol/kg). Then, it was polymerized at 255° C. for 5 hours.

The reaction mixture was sieved through a 0.1 mm mesh screen to separate only the granular polymer, which was washed with acetone and water to obtain a washed polymer.

A portion of the washed polymer was immersed in an aqueous 2% - $NH_4Cl$ solution and treated at 40° C. for 30 minutes. Then, it was washed with water and dried at 80° C. under a reduced pressure to obtain a polymer C-3.

Synthetic Experimental Example 6:

Into a titanium-lined autoclave, 423 kg of hydrous sodium sulfide (solid content, 46.13%) and 927 kg of NMP were charged and the temperature was increased to about 203° C. to distill off 167 kg of water. 65 kg of NMP were supplied additionally (total water/NMP=3.5 mol/kg). Then, 365 kg of p-dichlorobenzene was charged (total arylene group/NMP=2.5 mol/kg).

After reacting at 220° C. for 5 hours, 92.5 kg of water was supplied additionally (total water/NMP=8.75 mol/kg). Then, it was polymerized at 265° C. for 45 minutes and at 255° C. for 4 hours.

The reaction mixture was sieved through a 0.1 mm mesh screen to separate only the granular polymer which was washed with acetone and water to obtain a washed polymer.

A portion of the washed polymer was immersed in an aqueous hydrochloric acid solution of pH=1 and treated at 40° C. for 30 minutes. Then, it was washed with a diluted aqueous solution of ammonia, then with water and dried under a reduced pressure to obtain a polymer C-4.

EXAMPLE

A predetermined amount of each synthesized polymer was uniformly blended by a Henshel mixer, melt-kneaded by a parallel twin-screws kneading extruder and molded into a pellet-like product. Each product was measured for the necessary time for 50% crystallization and the particle size of spherulites.

The necessary time for 50% crystallization was determined by the conventional method using DSC (for example, as described in "High Polymer Chemistry" 25, 155 (1968)). The measuring conditions are as follows. About 5 mg of each samples was melted at 340° C. for one minute and rapidly cooled to 250° C. at a rate of 200° C./minute and kept at 250° C. to obtain an isothermal crystallization curve. Based on the obtained isothermal crystallization curve, a time required for crystallizing 50% of the entire crystallizable ingredient, $\tau_{\frac{1}{2}}$, was determined.

The size of the spherulites was measured with an optical microscope equipped with a heating stage, by heating each sample to melt at 340° C. for one minute, rapidly cooling to 250° C. and observing a state of forming the spherulites while maintaining the temperature at 250° C.

The inherent solution viscosity was measured by subjecting the synthesized granular polymer for the single polymer, and the pulverizate of a pellets for the blended polymer, respectively. The measuring conditions are with 1-chloronaphthalene solution of the sample polymer at 0.4 g/dl in concentration at 206° C.

The results of the measurement are collectively shown in Table 1.

TABLE 1

| Exp. No. | Composition* (wt %) | $\eta_{inh}$ (dl/g) | $\tau_{\frac{1}{2}}$ (sec) | Size** (μm) | Remarks |
|---|---|---|---|---|---|
| 1 | B/A = 100/100 | 0.22 | 25 | 7 | Example |
| 2 | C-1 | 0.22 | 40 | 10 | Com. Example*** |
| 3 | B/A = 42.9/100 | 0.26 | 45 | 6 | Example |
| 4 | C-2 | 0.26 | 110 | 7 | Com. Example |
| 5 | B/A = 25.0/100 | 0.28 | 50 | 4 | Example |
| 6 | C-3 | 0.28 | 120 | 6 | Com. Example |
| 7 | B/A = 17.7/100 | 0.29 | 70 | 2 | Example |
| 8 | C-4 | 0.29 | 150 | 3 | Com. Example |

*A: $\eta_{inh}$ = 0.34 dl/g; $\tau_{\frac{1}{2}}$ = 170 seconds; size of spherulites < 1 μm
B: $\eta_{inh}$ = 0.14 dl/g; $\tau_{\frac{1}{2}}$ = 30 seconds; size of spherulites = 20 μm
**means Size of Spherulites.
***means Comparative Example.

PROCESSING EXAMPLE 25.0 parts by weight of PATE (B) based on 100 parts by weight of PATE (A), as well as 66.7 parts by weight of glass fibers (10 μm diameter: "CS3J-942CB ®", manufactured by NITTOBO CO.), 1.0 part by weight of calcium carbonate and 0.1 part by weight of calcium hydroxide based on 100 parts by weight of the resin composition (A+B), were blended in a Henshel mixer and then pellet (GF-1) was prepared from the blend by a pelletizer. Further, another pellet (GF-0) was prepared in the same manner as above, excepting that polymer C-3 was used instead of the resin composition. From these glass fiber-reinforced pellets, test pieces of (GF-1) and (GF-0) for the measurement of physical properties were prepared by an injection molding machine (IS-75EV, manufactured by TOSHIBA KIKAI CO.), under the molding conditions of (i) resin temperature 335° C.; (ii) injection pressure 1,000 kg/cm²; (iii) mold temperature 140° C. and (iv) mold retention time 25 seconds; and the mold releasability of each sample are observed simultaneously. Further, after applying heat treatment at 204° C. for 4 hours of the obtained test pieces (GF-1) and (GF-0), flexural strength, flexural modulus and Izod impact strength were measured in accordance with the method of ASTM D790, D790 and D256, respectively. The results are shown in Table 2.

TABLE 2

| Molding product | GF-1 | GF-0 |
|---|---|---|
| Resin composition | B/A = 25.0/100 | C-3 |
| Glass fiber content (wt %) | 40 | 40 |
| Mold releasability | good | poor |
| Flexural strength (kg/mm²) | 28 | 23 |
| Flexural modulus (kg/mm²) | 1580 | 1400 |
| Izod impact strength (V-notch) (kg · cm/cm) | 9.5 | 7.3 |
| Remarks | Example | Comparative Example |

What is claimed is:

1. A polyarylene thioether composition comprising:
100 parts by weight of a polyarylene thioether (A) having an average particle size of spherulites of not more than 2 μm formed upon crystallization of the molten polymer at 250° C. obtained by treating a polyarylene thioether having a repeating unit of

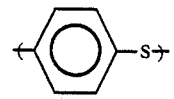

as a main constituent and an inherent solution viscosity, which is measured at 206° C. in 1-chloronaphthalene at a polymer concentration of 0.4 g/100 ml solution, of 0.30 to 0.90 dl/g with an aqueous solution of non-oxidative strong acid or non-oxidative strong-acid-weak-base salt; and 11 to 200 parts by weight of a polyarylene thioether (B) having a necessary time for 50% crystallization of not more than 50 seconds upon crystallization of the molten polymer at 250° C. obtained by treating a polyarylene thioether having a repeating unit of

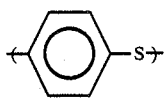

as a main constituent and an inherent solution viscosity, which is measured at 206° C. in 1-chloronaphthalene at a polymer concentration of 0.4 g/100 ml solution, of 0.05 to 0.25 dl/g with an aqueous solution of non-oxidative strong acid or non-oxidative strong-acid-weak-base salt.

2. The polyarylene thioether composition according to claim 1, wherein the necessary time for 50% crystallization of said composition, which comprises said polyarylene thioethers (A) and (B), at 250° C. is not more than 100 seconds and an average particle size of spherulites formed therein is not more than 8 μm.

3. The polyarylene thioether composition according to claim 1, wherein said polyarylene thioethers (A) and (B) contain not less than 60 mol % of a repeating unit of

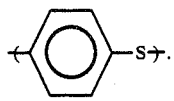

4. The polyarylene thioether composition according to claim 1, wherein said polyarylene thioether (A), polyarylene thioether (B) or both polyarylene thioethers (A) and (B) comprises copolymers which contain 60 to 95 mol % of a repeating unit of

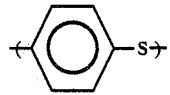

and 40 to 5 mol % of a repeating unit of

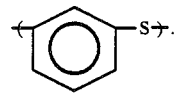

5. The polyarylene thioether composition according to claim 4, wherein said copolymer is a block copolymer which contains the repeating units of

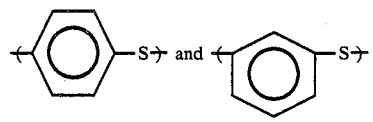

each in block form.

6. The composition according to claim 1, wherein said strong acid is selected from the group consisting of hydrochloric acid, diluted sulfuric acid and phosphoric acid and said strong-acid-weak-base salt is selected from the group consisting of $NH_4Cl$, $(HN_4)_2SO_4$ and $(NH_4)_3PO_4$.

7. A polyarylene thioether blend comprising:
100 parts by weight of the composition comprising said polyarylene thioethers (A) and (B) according to claim 1 and
up to 300 parts by weight of inorganic powdery filler, fibrous filler or a mixture thereof.

8. The polyarylene thioether blend according to claim 7, wherein said inorganic powdery filler comprises talc, mica, clay, kaolin, calcium carbonate, magnesium carbonate, calcium silicate, magnesium silicate, silica, alumina, titanium white, carbon black, calcium sulfate, iron oxide, zinc oxide, copper oxide or mixtures thereof.

9. The polyarylene thioether blend according to claim 7, wherein said fibrous filler comprises glass fiber, carbonate fiber, silica fiber, alumina fiber, silicon carbide fiber, zirconia fiber, calcium titanate fiber, wollastonite, calcium sulfate fiber, aramide fiber or mixtures thereof.

* * * * *